United States Patent [19]

Preston

[11] Patent Number: 5,570,581
[45] Date of Patent: Nov. 5, 1996

[54] HYDRAULIC VALVE OPERATOR

[75] Inventor: Kirk H. Preston, Huntington Beach, Calif.

[73] Assignee: Pacific Technical Equipment and Engineering Inc., Huntington Beach, Calif.

[21] Appl. No.: 388,629

[22] Filed: Feb. 14, 1995

[51] Int. Cl.$^6$ .............................. F16D 31/02; F16K 31/12
[52] U.S. Cl. ................................................ 60/483; 251/58
[58] Field of Search .............................. 60/325, 483, 484, 60/393, 458; 92/136; 280/149.2, 727; 251/58, 59; 91/533, 534

[56] References Cited

U.S. PATENT DOCUMENTS

| | | |
|---|---|---|
| 1,755,432 | 4/1930 | Dean . |
| 2,596,532 | 5/1952 | Coolidge et al. . |
| 2,942,581 | 6/1960 | Gaffney . |
| 3,131,586 | 5/1964 | Wilson . |
| 3,166,952 | 1/1965 | Lang ...................... 60/483 X |
| 3,206,931 | 9/1965 | Wilson ...................... 60/483 |
| 3,437,158 | 4/1969 | Proffer . |
| 3,480,099 | 11/1969 | Nighswonger et al. .............. 60/483 X |
| 3,481,229 | 12/1969 | Dickmann et al. . |
| 3,703,123 | 1/1963 | Hodeson et al. ...................... 91/534 X |
| 3,768,775 | 10/1973 | Archer . |
| 3,847,039 | 11/1974 | Azuma . |
| 4,093,179 | 6/1978 | Schmidt . |
| 4,131,133 | 12/1978 | Huwe . |
| 4,279,181 | 7/1981 | Birkestrand . |
| 4,280,373 | 7/1981 | Denkowski et al. . |
| 4,561,459 | 12/1985 | Jackman . |
| 4,597,437 | 7/1986 | McNabb ......................... 280/149.2 X |
| 4,624,333 | 11/1986 | Minor ..................... 60/484 X |
| 4,643,218 | 2/1987 | Reed . |
| 4,687,179 | 8/1987 | Smith ..................... 251/59 X |
| 4,738,104 | 4/1988 | Hahmann et al. ............ 60/484 X |
| 4,739,682 | 4/1988 | Birkestrand . |
| 4,757,684 | 7/1988 | Wright ................... 251/59 X |
| 4,986,301 | 1/1991 | Ziliani et al. . |
| 5,137,296 | 8/1992 | Forman ........................... 280/149.2 X |
| 5,197,362 | 3/1993 | Birkestrand . |
| 5,233,590 | 10/1993 | Klemm ..................... 60/483 X |
| 5,257,771 | 11/1993 | Portis et al. . |
| 5,381,996 | 1/1995 | Arnemann et al. ...................... 251/59 |

Primary Examiner—Hoang Nguyen
Attorney, Agent, or Firm—Fulwider Patton Lee & Utecht, LLP

[57] ABSTRACT

A hydraulic valve operator includes a pair of reversible, variable speed hydraulic motors mounted on a swivel housing which is in turn mounted to an extendable frame assembly. The motors are disposed on diametrically opposite sides of a bull gear cavity formed on the swivel housing into which is placed a bull gear. The bull gear is meshed with pinion gears driven by the respective hydraulic motors. The bull gear has a vertically extending swivel bore formed thereon into which nests a drive swivel, the drive swivel being free to rotate about its vertical axis therein. The drive swivel has a vertical drive socket formed thereon for telescopical receipt of an elongated valve drive rod therein. The drive rod has connected at the bottom end thereof a drive head to engage and act upon the drive coupling of the valve stem which is to be rotated to either open or close the respective valve stem.

16 Claims, 5 Drawing Sheets

HYDRAULIC VALVE OPERATOR

BACKGROUND OF THE INVENTION

1. Field of the Invention

The present invention relates to valve operators and, more particularly, to an underground valve operator to be mounted to a transport vehicle.

2. Description of the Prior Art

Underground valves, such as are found in gas and water distribution systems, are typically operated very infrequently, with the interval between successive operations thereon possibly lasting up to several years. During these extended periods of non-use, the valve stems connected to these valves tend to bind due to the accumulation of deposits, silt, corrosion and the like. As such, the drive couplings on these valve stems can present substantial resistance to rotation. In such a situation, high torque is required to loosen and rotate such valve stems to thereby open or close the respective valves.

A number of different embodiments of valve operators which generate and apply very high torque to such bound drive couplings have been known for a number of years, and by way of example, embodiments of such high torque valve operators can be found in U.S. Pat. Nos. 1,755,432, 3,481,229, 3,768,775, 3,847,039, and 5,257,771.

The above mentioned prior art valve operating devices have some disadvantageous features associated with them. In many of the prior art embodiments, the valve operating devices are bulky and massive and therefore relatively large amounts of manpower and man-hours are required to operate and transport such types of valve operators. As such, those prior art devices are very time-consuming and quite expensive to operate and are therefore very inefficient.

In another embodiment of the prior art valve operators, set forth in U.S. Pat. No. 1,755,432, the valve operating device is mounted to a motor vehicle in an attempt to solve the transporting problem found in the other prior art valve operating devices. However the valve operating device is mounted beneath the motor vehicle so that the valve actuating drive rod must be extended through the running board of the vehicle in order for it to engage and act upon the particular drive coupling on the valve stem. This therefore not only requires that substantial modifications be made to the frame of the vehicle in order to properly house such a device, but further makes aligning the drive coupling on the valve stem with the valve actuating drive head a very difficult and time-consuming task, as the motor vehicle must be carefully positioned so that the drive coupling and opening through which the drive head is lowered are properly aligned. This can prove to be a difficult and tedious task since the drive head and drive coupling are disposed directly beneath the vehicle so that the operator does not have a good vantage point from which to observe and align the drive coupling on the valve stem and the valve actuating drive head.

In yet another prior art valve actuating device, set forth in U.S. Pat. No. 3,847,039, the valve operating device is mounted to the bed of a truck in an attempt to solve the transporting problem as well as the aligning problem found in the other prior art devices. The device includes a rotatable boom which has mounted on the distal end thereof the valve actuating means, and which further has its proximate end disposed on and slidable along a track mounted to the bed of the truck. The boom may be rotated outwardly from the truck bed and the proximate end slid along the track to align the valve actuating means with the underground drive coupling on the valve stem so that a valve actuating drive head may be extended through the valve actuating means to engage and act upon the drive coupling on the valve stem. This device is not free from disadvantages, however. In the first place, the device is relatively bulky and massive so that it consumes substantially the entire bed of a truck, thus leaving very little room for the storage of other items thereby significantly reducing the hauling capabilities of the vehicle. In addition, near perfect alignment is required to achieve operational engagement of the driver with the drive coupling on the valve stem.

As such, it may be appreciated that there continues to be a need for a valve operating device which is efficient to operate, is relatively compact and will accommodate a certain amount of misalignment between the driver and the valve stem coupling. The instant invention addresses such needs.

SUMMARY OF THE INVENTION

Briefly and in general terms, the present invention includes a swivel housing having upper and lower ends which has mounted on the upper end thereof a pair of oppositely disposed, reversible, variable speed hydraulic motors. The hydraulic motors each drive respective spaced apart pinion gears disposed on the diametrically opposing sides of a bull gear. The bull gear is formed with a vertically projecting swivel bore which receives a drive swivel configured for coupling therein for rotation therewith about a vertical axis but to allow for swivelling about such axis. Such swivel is formed with a generally square cross-section vertical drive socket for receipt of a square cross-section drive rod. The drive rod mounts on the lower end thereof a valve drive head to engage the underground drive coupling on the valve stem. In one embodiment, the swivel housing is mounted on a pair of rails defining an extendable frame member carried telescopically from a stationary frame section mounted to the bed of a truck or some such similar transport vehicle. The stationary frame section mounts a hydraulic fluid reservoir which conducts hydraulic fluid to the respective motors. The fluid is driven by a hydraulic power take-off from the transport vehicle, thereby pressurizing the hydraulic motors and allowing the operator to rotate the valve drive head in either a clockwise or counter clockwise direction to, respectively, close or open the valve.

Other features and advantages of the invention will become apparent from the following detailed description, taken in conjunction with the accompanying drawings which illustrate, by way of example, the features of the invention.

DETAILED DESCRIPTION OF THE PREFERRED EMBODIMENTS

Figure 1:
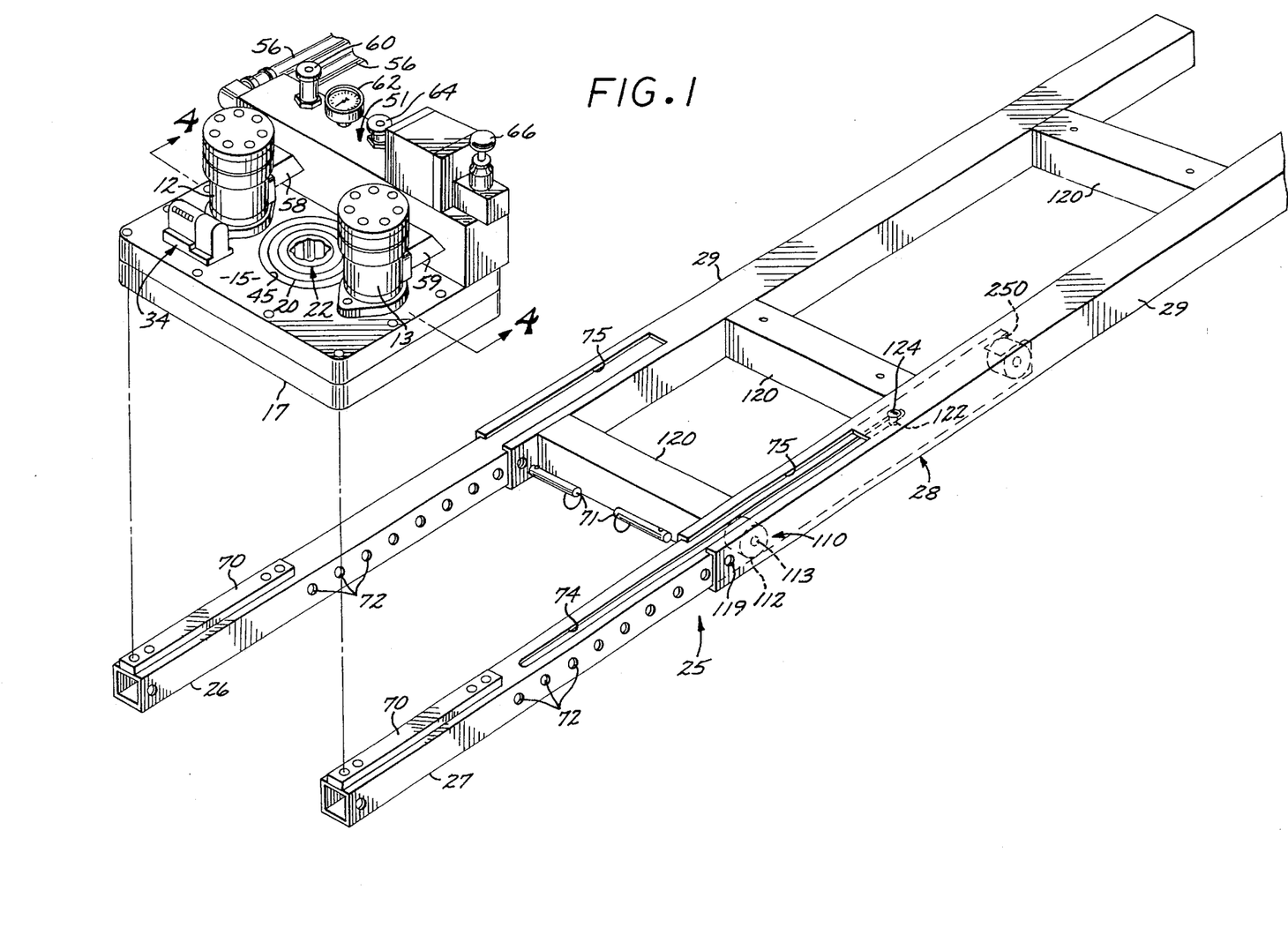
FIG. 1 is a fragmentary perspective view of a valve operating apparatus embodying the present invention.
Figure 3:
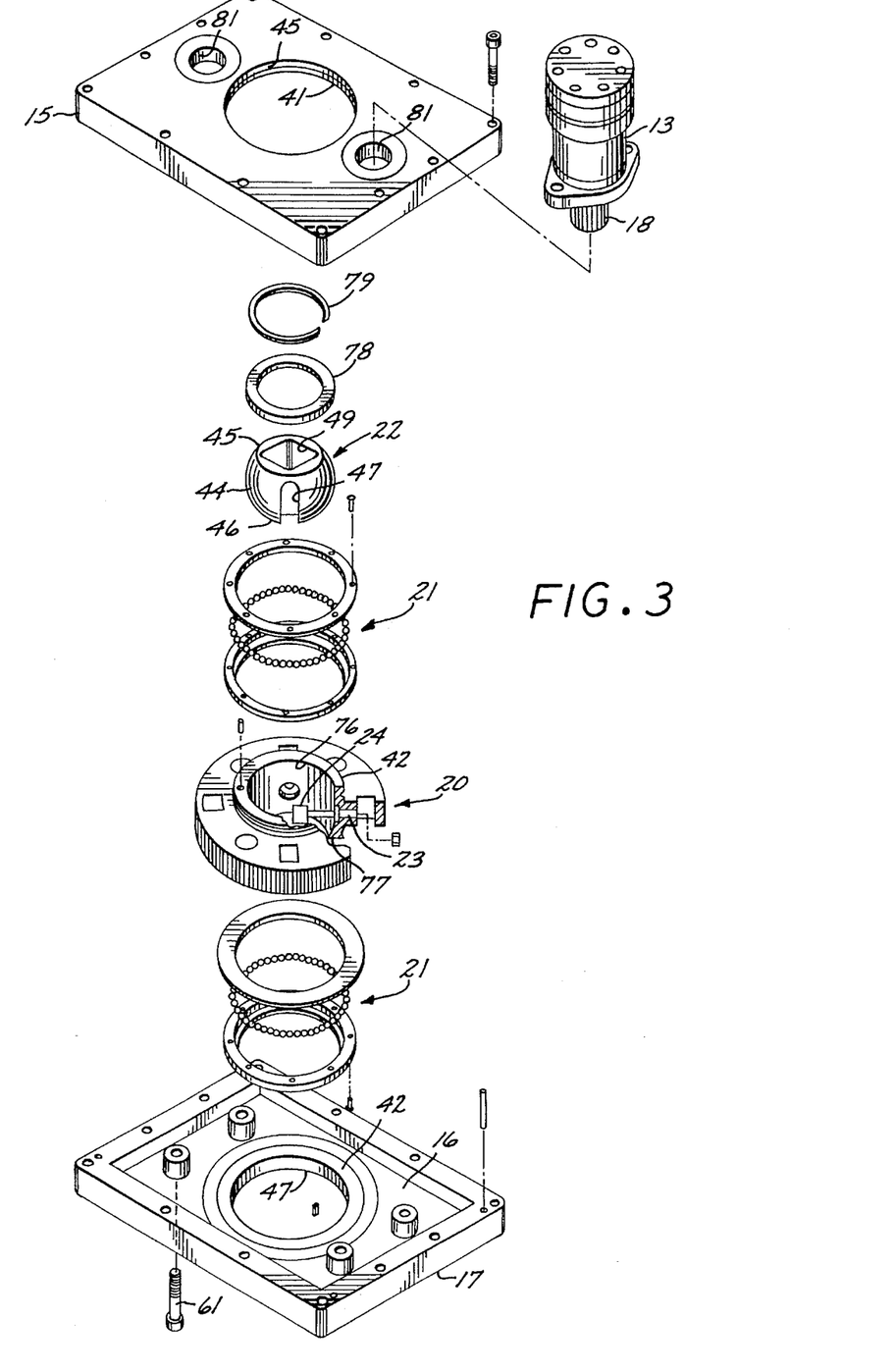
FIG. 3 is an exploded view of a swivel housing and components included in the valve operating apparatus shown in FIG. 1.
Figure 4:
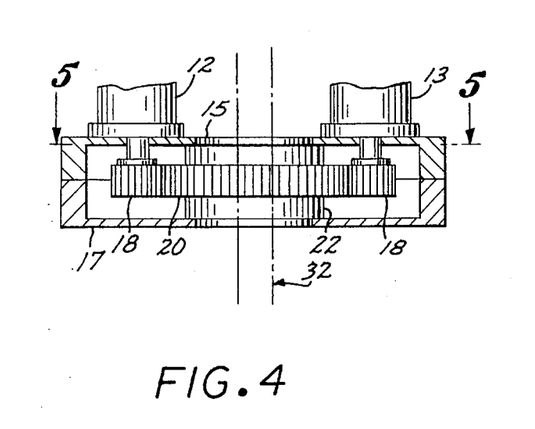
FIG. 4 is a vertical sectional view, in enlarged scale, taken along the line 4—4 of FIG. 1.
Figure 5:
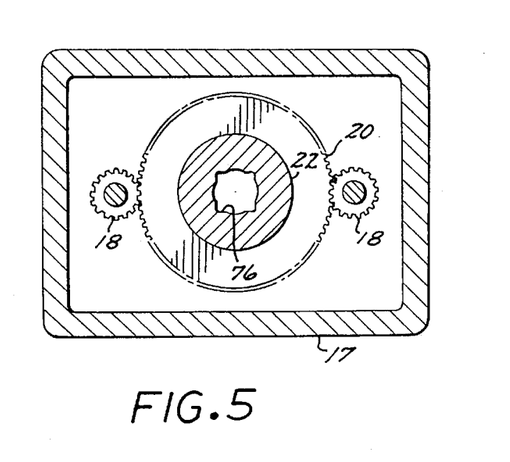
FIG. 5 is a horizontal cross-sectional view taken along the line 5—5 of FIG. 4.
Figure 6:
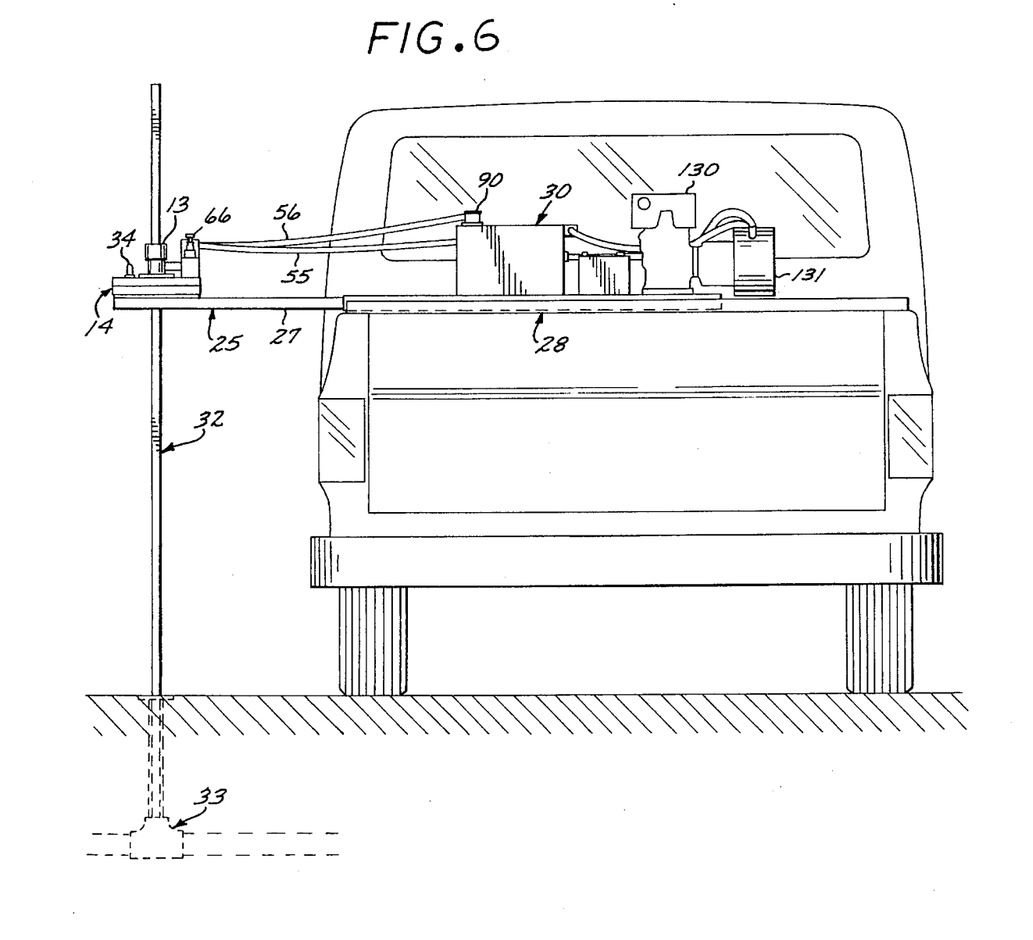
FIG. 6 is a back view of a transport truck, in reduced scale, having the hydraulic valve operator of FIG. 1 mounted thereon.
Figure 7:
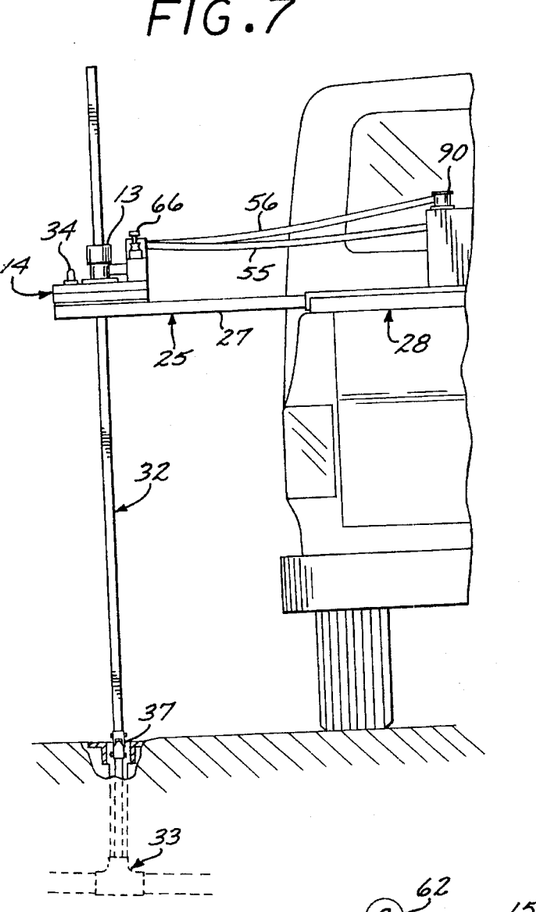
FIG. 7 is a partial back view similar to FIG. 6.
Figure 8:
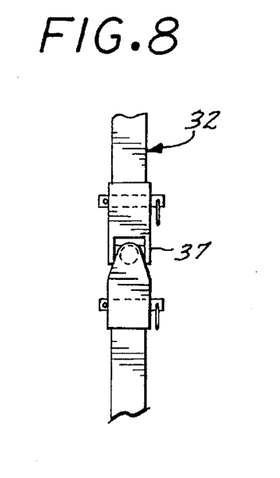
FIG. 8 is a back view, in enlarged scale, of a universal joint in a drive shaft included in the valve operating apparatus shown in FIG. 7.

In the following detailed description, like reference numerals will be used to refer to like or corresponding elements in the different figures of the drawings. Referring now to the drawings, and particularly to FIG. 1, there is shown generally a swivel housing 14 in position to be mounted on a pair of rails 26 and 27 defining an extendable section, generally designated 25, such extendable section received telescopically in a stationary frame section, generally designated 28. The swivel housing mounts thereon a pair of reversible, variable speed hydraulic motors 12 and 13 (FIGS. 1 and 4). The hydraulic motors are disposed on diametrically opposite sides of a vertically extending bull gear cavity 16 formed in the housing into which is placed a bull gear 20 (FIGS. 1, 3 and 5). A drive swivel, generally designated 22, having a generally square cross-section vertical drive passage formed thereon is received into a vertically projecting swivel bore formed on the bull gear (FIG. 3). The stationary frame section 28 is constructed for mounting on a motor vehicle so that the motor vehicle may be driven to a field site, adjacent an underground valve and the frame section 25 telescopically extended from the stationary frame section such that a valve drive rod, generally designated 32, may be slidably extended downwardly through the passage formed on the drive swivel to engage and rotate the drive coupling on the valve stem to either open or close the valve, generally designated 33 (FIGS. 6 and 7).

Referring to FIG. 3, the swivel housing 14 includes top and bottom plates 15 and 17 formed with confronting marginal stand off borders and centrally disposed concentric collars 41 and 42 which surround circular clearance openings 45 and 47. Received in stacked relationship between such plates 15 and 17 is the centrally disposed bull gear 20 formed with an annular ring configured with peripheral teeth and having formed centrally therein a generally cylindrically shaped, upwardly opening, swivelable pocket 76 which projects downwardly and curves generally spherically inwardly to form a support lip 77 for swivel receipt and nesting of the swivel ball 22.

The bull gear 20 is formed on its top and bottom sides with respective axially extending circular collars 41 and 42 which are telescopically received in the respective openings 45 and 47. The bull gear is formed with a radially projecting bore 23 for receipt of a limit pin 24 which projects radially inwardly into the socket pocket 76 to limit horizontal rotation of the swivel ball 22 relative to such bull gear as will be described hereinafter. Sandwiched between the respective under side and top side of such bull gear and the respective plates 15 and 17 are respective ball bearing assemblies, generally designated 21, including respective ball bearings caged in respective oppositely disposed races.

With continued reference to FIG. 3, the drive swivel 22 includes a spherically shaped ball 44 configured to be freely received downwardly into the pocket 76 and is formed centrally with a square in cross section passage 49 for receipt of the square shaped drive rod 32. Formed in one side of the ball 44 is a downwardly opening diametrical limit slot 47 configured to slide complementally over the limit pin 24 to limit rotation about a vertical axis while accommodating swivel about a horizontal axis. Disposed in nesting relation over the top hemisphere of the swivel ball 44 is an annular shaped keeper 78 formed with a downwardly opening spherically shaped ring sector for complemental nesting on the upper hemispherical surface of the ball 44 and locked in position by means of a split lock ring 79.

Referring to FIG. 3, the top plate 15 has formed therein in spaced relation to the diametrical opposite sides of the opening 45 a pair of bores 81 through which the downwardly projecting drive shafts of the respective hydraulic motors 12 and 13 project to mount on the lower extremities thereof respective pinions 18 configured to mesh with the bull gear 20 (FIG. 4).

Referring to FIG. 1, a mechanical counter 34 is mounted forwardly on the bull gear housing and is mechanically coupled with the bull gear to count the forward and reverse turns of the bull gear to thus provide an indication of the rotations applied to the valve being opened or closed.

Figure 9:
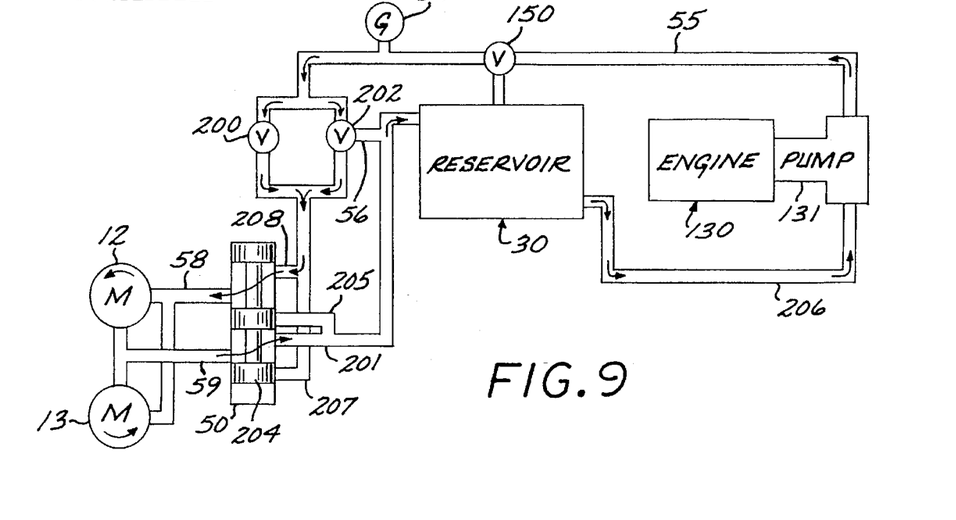
FIG. 9 is a schematic diagram of the hydraulic circuit included in the valve operating apparatus shown in FIG. 1.
Figure 10:
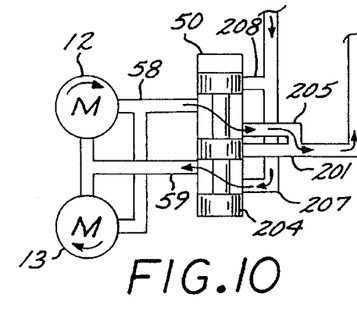
FIG. 10 is a partial schematic diagram similar to FIG. 9 but showing the motor operator valve in a different position.

A generally rectangular aluminum control manifold 51 is mounted on the swivel housing 14 immediately behind the hydraulic motors 12 and 13 (FIG. 1 ). The manifold is formed internally with a plurality of manifold passages to define a portion of a hydraulic circuit which directs hydraulic fluid to the respective motors (FIG. 9). The manifold has formed on one side wall thereof a pair of threaded bores for releasable engagement with a pair of hydraulic fluid lines 55 and 56 (FIG. 1 ). Extending from the front wall of the manifold are a pair of conduits 58 and 59 which are connected at their one ends to the respective hydraulic motors and at their other ends to the passages formed in the manifold and as such serve to conduct fluid therebetween (FIGS. 9 and 10). The manifold has a plurality of bores formed on the top surface thereof onto which are mounted a torque control knob 60, a pressure gauge 62, a speed control knob 64, and a three way switch 66. The control manifold further has a pair of threaded bores formed on the back wall thereof (not shown). One of those bores is engaged by a female quick coupler and the other bore is engaged by a male quick coupler so that the hydraulic valve operator 10 may deliver hydraulic power to other hydraulically operated devices which do not have their own hydraulic fluid supplies. Attached to the male and female couplers are a pair of fifty foot long hoses (not shown) so that the hydraulic valve operator may drive those other devices from some distance away.

The rails 26 and 27 define the extendable frame section 25 and comprise elongated, hollow, open ended square tubes which have mounted on the upper surfaces of the free ends thereof respective longitudinal mounting bars 70 which serve to receive the mounting bolts 61 from the swivel housing 14 and thereby securely mount the housing thereon (FIGS. 1 and 3). The rails further have formed on each of the side walls thereof a plurality of longitudinally spaced apart adjustment pin bores 72 which are formed in pairs for positioning in alignment with one another, such pin bores to accept hitch pins 71 therein to thereby lock such rails in position. Disposed within the rails adjacent the telescoped ends thereof are roller bearing assemblies 110 comprising cylindrical wheels 112 (FIG. 1 ). The rails have formed in the upper and lower walls thereof adjacent such telescoped ends longitudinal open ended wheel channels 25 with cross sectional diameters larger than that of the wheel so the wheel may be inserted into such channels and extrude through such channels to contact the upper and lower inwardly facing walls of the stationary frame section to allow for rotation therein of the wheel and thus provide for relatively easy extension and retraction of the rails within the frame. The wheel is maintained in position by means of a retainer pin which projects radially outwardly from the wheel and is accepted in a retainer bore formed on the side wall of the rail (not shown). Also formed in the upper wall of the rail 27 is an elongated open ended channel 74 which slidably receives a retainer screw 124 carried from the stationary frame section to thereby allow for relative sliding thereof but limiting the extent thereof.

Figure 2:
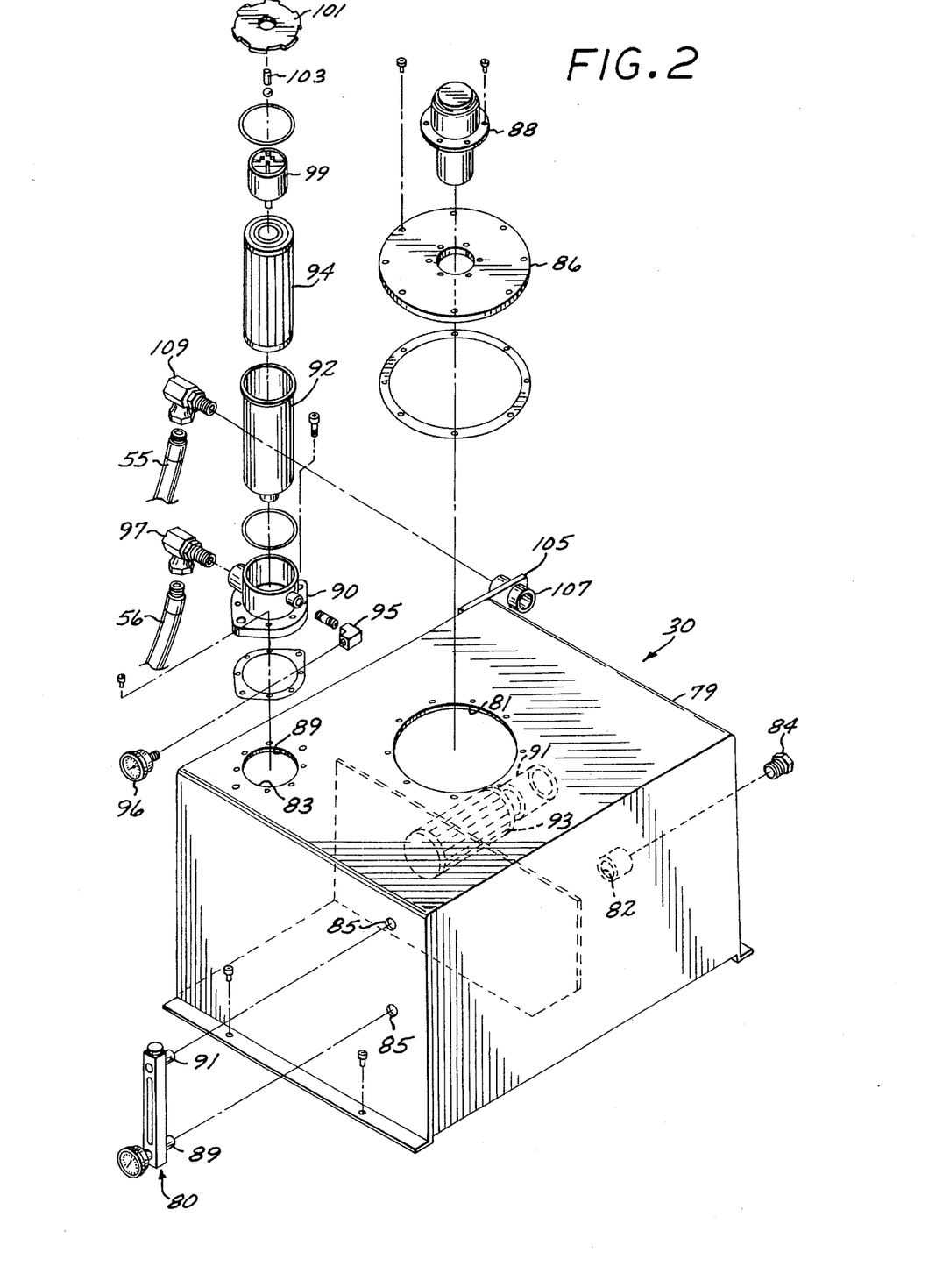
FIG. 2 is an exploded perspective view, in enlarged scale, of a hydraulic fluid reservoir included in the valve operating apparatus shown in FIG. 1.

The stationary frame section 28 includes a pair of elongated open ended square tubes 29 into which the respective rails 26 and 27 are telescopically received (FIG. 1). The tubes have formed in the upper walls thereof adjacent the rail receiving ends thereof a pair of open ended slats 75 for telescopical receipt therein of the respective mounting rails 70. The stationary frame section further includes three lateral beams 120 interposed between the tubes which serve to fixedly attach the tubes to one another while also mounting thereon the hydraulic fluid reservoir 30 (FIG. 2). One of such tubes has formed on the upper surface thereof a threaded bore 122 aligned with the channel 74 formed on the rail 27, such bore to threadably receive therein the retainer screw 124. With such screw engaged with the threaded bore, the lower end of such screw projects through the channel 74 and thereby limits the telescopical extension of the extendable frame section 25 (FIG. 1). Formed in the outside walls adjacent the rail receiving ends of the tubes 29 are respective adjustment pin bores 119 which slidably receive the hitch pins 71 therein and thereby may serve to securely lock the rails 26 and 27 in position. The stationary frame section further has formed thereon a plurality of vehicle mounting bores which allow for the frame assembly to be fixedly attached to a transport vehicle (not shown).

Referring to FIG. 9, the hydraulic circuit includes a hydraulic pump 131 which may be powered by the vehicle engine or an auxiliary engine 130 and includes an outlet having a flow control valve 200 and a variable pressure relief valve 202 connected thereto by means of a hydraulic line 55. The respective outlets of the valves 200 and 202 are connected with the inlet ports of a three position, four way, 90 degree rotationable spool valve 50 with the downstream ports thereof being connected with the ports of the respective reversible motors 12 and 13 by means of the respective conduits 58 and 59 (FIGS. 9 and 10). The return ports of the spool valve 50 are connected with respective outlet passages 201 and 205 which join together in a return conduit 56 leading to the inlet of a fluid reservoir, generally designated 30. The outlet of such reservoir is connected with the inlet to the hydraulic pump 131 by means of the conduit 206.

The position of the spool 204 of the spool valve 50 is controlled by the three position switch 66 mounted on the manifold 51 and arranged to shift the spool selectively to three different positions for forward, reverse and neutral, to be described hereinafter. The flow control valve 200 and variable pressure valve 202 are controlled by respective control knobs 60 and 64 which serve to adjust the respective valves to control the fluid flow and pressure applied to the motors 12 and 13 to thereby control the speed and torque applied to such motors.

The torque control knob 60 may be manually rotated in either a clockwise or counter-clockwise direction, such rotation thereof serving to, respectively, increase or decrease the amount of torque generated by the motors which is applied to the drive coupling on the valve stem. The torque control knob acts upon the variable pressure relief valve 202 connected in line with the hydraulic fluid line 55 and further connected to the return fluid line 56 to flow excess fluid to the reservoir (FIG. 9). The valve may be preset or adjusted to set the maximum pressure in the fluid line, and as such determine the torque generated by the respective motors. In the preferred embodiment, the torque may be varied between 0 and 2,500 Ft/Lb.

The pressure gauge 62 is connected in line with the hydraulic fluid line 55 and gives a visual indication to the operator of the pressure present in that fluid line (FIG. 9). In the preferred embodiment, the gauge displays pressures in the range of 0–3,000 PSI.

The speed control knob 64 is operative to vary the speed at which the motors 12 and 13 rotate the valve drive rod and thus the drive coupling on the valve stem. The speed control knob acts upon a flow control valve 200 connected in line with the fluid line 55 (FIG. 9). The flow control valve may vary the flow rate of the hydraulic fluid in the fluid line, and as such vary the rotation speed of the respective motors. By way of example, if a particular drive coupling is to be rotated only a fraction of one turn, then the operator may manually reduce the fluid flow rate and therefore the speed at which the valve drive rod and the drive coupling are rotated so that the drive coupling will not accidentally be over-rotated. In the preferred embodiment, the speed control knob allows the operator to vary the rotational speed of the valve drive rod between 10–50 RPM.

The three way switch 66 may be set to any one of three different positions corresponding with the forward, neutral, and reverse operation of the hydraulic motors 12 and 13 which serve to, respectively, open, maintain, and close the valve. The switch drives the spool poppet 204 housed in the spool valve 50 (FIGS. 9 and 10). If the switch is placed in the position corresponding with the forward operation of the motors, then the spool poppet is driven to a predetermined position to block the conduits 201 and 208 and allows fluid to flow through the conduits 207 and 205 so that hydraulic fluid will be delivered to the motors 12 and 13 through the conduit 59 and will be returned to the spool valve through the conduit 58, such fluid flow direction serving to rotate the motors in a clockwise direction when viewed from above (FIG. 10). Such clockwise rotation of the motors will rotate the valve drive rod interposed between the motors and thus the drive coupling on the valve stem in a counter-clockwise direction to thereby open the valve. If the switch instead is placed in the position corresponding with the reverse operation of the motors, then the spool valve is driven to a second position to block fluid flow through the conduits 205 and 207 so that hydraulic fluid flows through the conduits 201 and 208 and therefore flows to the motors through the conduit 58 and returns from the motors to the spool valve through the conduit 59 which serves to drive the motors in a counter-clockwise direction when viewed from above which closes the valve (FIG. 9).

The hydraulic fluid line 55 has connected in line therewith a pressure relief valve 150 to limit the pressure which will be applied to the hydraulic motors 12 and 13 (FIG. 9). If the particular drive coupling on a valve stem is bound to such an extent that it is very difficult to rotate, the pressure in the hydraulic fluid line 55 may build until it approaches a dangerously high level. In such a situation, the variable pressure relief valve acts to reduce the pressure in the line by directing fluid back to the fluid reservoir 30 that would otherwise be conducted through the fluid line 55 to the hydraulic motors 12 and 13.

The fluid reservoir, generally designated 30, includes a rectangular housing 79 formed in its top wall with a large circular filler hole 81 and a smaller diameter circular return hole 83. Formed in one side wall are a pair of vertically spaced apart mounting bores 85 for receipt of upper and lower tubular fittings 87 and 89 of a pressure and oil level gauge, generally designated 80.

Formed in the opposite wall is an opening for receipt of an internally threaded insert 82 for receipt of a drain plug 84. Formed in that same wall is a sump bore for receipt of a sump fitting 91 which mounts a sump strainer 93 for connection with the pressure hose as to be described hereinafter.

A reservoir cover fitting 86 is provided for overlying an annular gasket to be secured in covering relationship over the filler opening 81 and is formed with a central bore for telescopical receipt of the shank of a fuel cap and strainer assembly 88.

Mounted over the return port 83 is a cylindrical return head 90 formed with a mounting flange which is mounted in sealing arrangement over a complementary shaped gasket. The head 90 is formed with oppositely projecting internally threaded nipples, one for connection with a swivel joint 95 which mounts a pressure gauge 96 and the other of which receives a return hydraulic hose swivel 97 that connects with the return hose 56 from the manifold 51.

A cylindrically shaped filter bowl 92 is telescopically received within the head 90 and has mounted therein a cylindrical filter element 94. A by-pass element 99 is nested in overlying relationship over the filter 94 and is covered by a filter cover 101 which maintains the by-pass 99 biased against the filter by means of a spring 103.

Mounted to the reservoir housing 79 is an ear 105 which mounts an internally threaded nipple 107 that threadably receives a pressure swivel 109 connected with a pressure hose 55. The opposite end of the nipple 107 is connected with the pump 131 by means of a pump hose (not shown).

In operation, the hydraulic valve operator 10 of the present invention may be mounted across the top edges of the side walls of a pick up truck (FIG. 6) or may be flat bed mounted. When it becomes desirable to either open or close an underground valve, the truck is driven adjacent the hole leading down to the respective drive coupling on the valve stem. The operator may then manually extend the rails 26 and 27 until the vertical passage 49 on the drive swivel 22 is generally aligned with the drive coupling on the valve stem. If the drive coupling and vertical drive socket are not or cannot be perfectly aligned then the drive swivel 22 and the universal joint 37 may be adjusted to engage the drive coupling on the valve stem, as described below. When the rails have been telescopically extended to the desired position, the operator manually slides the hitch pins 71 through the adjustment pin bores 72 and 119 formed on, respectively, the rails 26 and 27 and the tubes 29 thereby securely locking the rails in position. The valve drive rod 32 is then slidably extended downwardly through the vertical passage 49 formed on the drive swivel 22 until the drive head engages the drive coupling on the valve stem. If the drive socket and the drive coupling on the valve stem are not perfectly aligned, then the operator may manually rotate the drive swivel and pivot the universal joint 37 until the valve drive head engages the drive coupling on the valve stem.

The hydraulic valve operator is then actuated by means of the hydraulic pump 131. The three way switch 66 may then be switched from neutral to either forward or reverse, depending on whether the valve is to be opened or closed. Assuming the valve is to be opened, the switch is turned to the forward position to flow hydraulic fluid through the fluid hose 55 to the control manifold 51 and consequently spool valve 50 (FIG. 9). The spool valve 50 then directs the fluid from the manifold to the hydraulic motors 12 and 13 through the conduit 58 thereby activating such motors to rotate the respective pinion gears 18 (FIG. 5) engaged on the diametrical opposite sides of the bull gear to apply balanced drive forces thereto to drive the bull gear 20. The bull gear and drive swivel are fixedly connected to one another so that any rotation of the bull gear creates a corresponding rotation of the drive swivel. As such, the drive swivel is driven by the rotation of the bull gear to rotate as well. The valve drive rod and the vertical passage formed on the drive swivel are both square in cross section so that there can be no relative radial rotation between the two. Therefore the valve drive rod, universal joint, and drive head are all simultaneously rotated thereby rotating the drive coupling on the valve stem to which the drive head is engaged which serves to open the valve. The counter gear 36 is meshed with the bull gear so that the operator has a visual indication of the number of revolutions made by the bull gear and thus the drive coupling on the valve stem as well. Thus the operator may quickly and efficiently rotate the drive coupling on the valve stem any desired number of full turns or fractions thereof.

Should the valve be stuck, the operator may manually increase the torque applied to the valve drive rod and drive head by means of the torque control knob 60. If the valve continues to resist rotation to such an extent that the pressure in the fluid line approaches an undesirably high level such that the hydraulic motors 12 and 13 are in jeopardy of being damaged by being overloaded, the pressure relief valve 202 will relieve to reduce the pressure in the fluid line 55 by directing fluid back to the reservoir 30 to thereby protect the motors. The speed at which the valve drive rod is rotated may be varied by means of the speed control knob 64, such varying of the rotational speed being preferable in situations where the valve is to be rotated only a fraction of one turn or where the valve is to be rotated a multiple number of turns.

When the valve has been either opened or closed to the desired extent, the three way switch 66 may be switched to its neutral position so that the spool valve 50 will be driven to a predetermined position to block the conduits 58 and 59 such that no fluid will be conducted to or from the motors 12 and 13 thereby ceasing the rotation of the motors and of the valve drive rod 32 as well. The operator may then manually disengage the drive head from the drive coupling on the valve stem and slidably remove the rod from the vertical drive socket. The hitch pins 71 may then be slidably disengaged from the adjustment pin bores 72 so that the rails 26 and 27 may be telescopically retracted into the tubes 29 of the stationary frame section and either left loose or locked in such a retracted position by means of engaging the hitch pins with the respective adjustment pin bores. The hydraulic valve operator is then ready to be moved to engage and act upon the next drive coupling.

From the foregoing, it will be appreciated that the hydraulic valve operator of the present invention is relatively compact and does not require the time consuming process of perfectly aligning the valve actuating means with the drive coupling on the valve stem in order for the valve rod and drive head to be able to engage and act upon the respective drive coupling. The spool valve control provides for convenient and relatively high flow rates with a long service free life. The operating torque can easily be set to a predetermined pressure to protect the hydraulic motors and the speed of operation can be easily adjustable.

While several forms of the invention have been illustrated and described, it will also be apparent that various modifications can be made without departing from the spirit and scope of the invention. Accordingly, it is not intended that the invention be limited, except as by the appended claims.

What is claimed is:

1. Valve operating apparatus for mounting on a transport vehicle to releasably engage a drive coupling on a stem of an underground valve, said apparatus comprising:

a horizontally projecting frame including a stationary frame section for mounting on said vehicle and an extendable frame section having open ends and being movably carried from said stationary section and further having a driver mount thereon for alignment over said drive coupling;

a swivel housing mounted on said driver mount and formed with a bull gear cavity;

a bull gear rotatably received in said cavity and formed with a vertically projecting upwardly opening generally hemispherical swivel pocket;

reversible hydraulic motors mounted on said housing and coupled with said bull gear for driving said bull gear;

a generally spherical drive swivel received in said pocket for rotation with said bull gear and swivelly mounted for swivel about a horizontal, said drive swivel being formed with a through vertical polygonal drive socket and including a vertically projecting radial limit slot;

a limit pin projecting from said bull bear into said limit slot to limit relative rotation of said drive swivel about a vertical axis:

a captive ring on said swivel housing and overlying said drive swivel;

a polygonal valve drive rod for complementary telescopical receipt in said socket, including a universal joint, and formed on its bottom end with a drive head for releasable engagement with said drive coupling; and a hydraulic control system connected with said motors and including a hydraulic reservoir, a pump for pumping hydraulic fluid from said reservoir to said motors, a variable pressure relief bypass valve interposed between said motor and said reservoir for bypassing hydraulic fluid from said pump to said reservoir, a pressure gauge for sensing the hydraulic pressure to said motor and a controller for controlling the pressure at which said pressure relief bypass valve relieves so the operator can control the pressure at which said pressure relief bypass valve will relieve in response to the pressure observed on said gauge.

2. The apparatus of claim 1 wherein:
   said drive rod includes a universal joint.

3. The apparatus of claim 1 further including:
   a torque control limiter connected with said motor for limiting the torque applied to said bull gear.

4. The apparatus of claim 1 wherein:
   said motors are reversible and variable speed.

5. The apparatus of claim 1 further including:
   a pair of said motors spaced apart on said swivel housing so that said bull gear cavity is interposed therebetween.

6. The apparatus of claim 1 further including:
   a gas engine mounted on said frame.

7. The apparatus of claim 1 wherein:
   said extendable and stationary frame sections are of tubular construction configured to telescope together for extension of said extendable frame section and including male and female tubes and longitudinal swivel housing mounting rails mounted on said male rails and open ended clearance slots formed in the female rails for complemental receipt of said rails when said extendable section is retracted.

8. The apparatus of claim 1 further including:
   a counter mounted on said swivel housing and coupled with said bull gear to count the rotations thereof.

9. The apparatus of claim 1 wherein:
   said motor is reversible and that includes:
   switch means for reversing the direction of rotation of said motor.

10. The apparatus of claim 1 wherein:
    said stationary and extendable frame sections are of tubular construction and include interfitting telescopically extendable male and female tubes, one of said male tubes including a longitudinal closed ended slot and a stop pin mated to the interfitting male tube and received in said slot to limit relative extension of said male tube.

11. The apparatus of claim 1 wherein:
    said hydraulic control system further includes a torque control valve and a manual control knob for adjusting the torque output by said motors, and speed control and shut off means for manual adjustment of the speed of said motors.

12. The apparatus of claim 1 wherein:
    said hydraulic motors are reversible hydraulic motors disposed on the diametrical opposite sides of said bull gear, including respective drive shafts mounting respective pinion gears meshing with the teeth of said bull gear and wherein;
    said hydraulic control system includes a spool valve including a pair of inlet ports, a pair of return ports, and a pair of motors ports;
    a hydraulic pressure line system connecting the outlet of said pump with said inlet ports, and at least one speed control valve in said pressure line system, respective hydraulic motor lines connecting said motor ports with the respective said inlet ports, a pair of hydraulic return lines connecting said return ports with said reservoir, and a hydraulic pump inlet line connecting said reservoir with the inlet to said pump, said spool valve including a spool poppet shiftable to one position for selectively opening one of said inlet ports and one of said outlet ports to rotate said motors in respective one direction and shiftable to a second position for selectively opening the other of said outlet ports and the other of said return ports to thus rotate the respective said motors in the opposite direction.

13. Valve operating apparatus in claim 12 wherein:
    said hydraulic control system includes a control panel including a control knob for adjusting the setting of said speed control valve.

14. Valve operating apparatus for mounting on a transport vehicle to releasably engage a drive coupling on a valve stem of an underground valve, said apparatus comprising:

a frame assembly including a stationary frame section comprising a pair of parallel spaced apart open ended, square-in-cross section tubes for mounting on said vehicle and an extendable frame section comprising a pair of hollow rails telescopically received on their one extremities in the respective said open ended tubes and formed on their respective proximal ends with respective upwardly opening clearance openings and medially with respective downwardly opening clearance openings, said frame assembly further including rollers mounted in said rails and extruding on their respective peripheries through the respective said clearance openings to contact said tubes to rotate as said rails are moved relative to said tubes;

a driver mount on said rails;

a swivel housing mounted on said driver mount and formed with a bull gear cavity;

a bull gear rotatably received in said cavity and formed with a vertically projecting swivel bore;

a motor for driving said bull gear;

a drive swivel received in said swivel bore for rotation with said bull gear and swivelly mounted for swivel about a vertical axis, said drive swivel being formed with a through vertical polygonal drive socket; and a polygonal valve drive rod for complementary telescopical receipt in said socket and formed on its bottom end with a drive head for releasable engagement with said drive coupling whereby said stationary frame section may be mounted on said vehicle, said extendable frame section extended in cantilever fashion with said rollers rolling on the interior surfaces of said tubes to carry the weight of said swivel housing and said vehicle moved into position to dispose said drive swivel in approximate vertical alignment over said drive coupling and said drive rod telescoped through said socket to engage said drive coupling so that said swivel will accommodate at least some vertical misalignment between said socket and said drive coupling.

15. Valve operating apparatus of claim 14 wherein:

said tubes are formed with respective top walls adjacent the respective open ends with open ended clearance slots;

wherein said mount includes a pair of elongated mounting bars, one mounted on the top of each of the respective said rails for telescopical receipt in the respective said slots when said rails are telescoped into the respective said tubes.

16. Valve operating apparatus for mounting on a transport vehicle to releasably engage the drive coupling on the valve of an underground valve, comprising:

a horizontally projecting frame including a stationary frame section for mounting on said vehicle and an extendable frame section having open ends and being movably carried from said stationary section and further having a driver mount thereon for alignment over said drive coupling;

a swivel housing mounted on said driver mount and formed with a bull gear cavity;

a bull gear rotatably received in said cavity and including rod drive means formed through vertical polygonal drive socket;

a pair of hydraulic motors for driving said bull gear;

a hydraulic control system connected with said motors and including a hydraulic reservoir, a pump for pumping hydraulic fluid from said reservoir to said motors, a manually variable pressure relief bypass valve interposed between said motor and said reservoir for bypassing hydraulic fluid from said pump to said reservoir, a pressure gauge for sensing the hydraulic pressure to said motors;

a manual control knob for controlling the pressure at which said pressure relief bypass valve relieves so that the operator can observe the pressure on said gauge while adjusting the pressure level at which said pressure relief valve relieves; and a polygonal valve drive rod for complementary telescopical receipt in said socket and formed on its bottom end with a drive head for releasable engagement with said drive coupling whereby said stationary frame section may be mounted on said vehicle, said extendable frame section extended and said vehicle moved into position to dispose said drive swivel in approximate vertical alignment over said drive coupling and said drive rod telescoped through said socket to engage said drive coupling and said control knob grasped to, while observing said pressure gauge adjust the pressure level at which said relief valve will relieve to thus adjust the maximum torque which can be applied to said drive coupling.

* * * * *

REEXAMINATION CERTIFICATE (4010th)

United States Patent [19]
Preston

[11] B1 5,570,581
[45] Certificate Issued Mar. 7, 2000

[54] HYDRAULIC VALVE OPERATOR

[75] Inventor: Kirk H. Preston, Huntington Beach, Calif.

[73] Assignee: Pacific Technical Equipment and Engineering Incorporated, Huntington Beach, Calif.

Reexamination Request:
No. 90/004,714, Aug. 1, 1997

Reexamination Certificate for:
Patent No.: 5,570,581
Issued: Nov. 5, 1996
Appl. No.: 08/388,629
Filed: Feb. 14, 1995

[51] Int. Cl.[7] .............................. F16D 31/02; F16K 31/12

[52] U.S. Cl. ................................................ 60/483; 251/58

[58] Field of Search ............................. 60/325, 483, 484, 60/393, 458; 92/136; 280/149.2, 727; 251/58, 59; 91/533, 534, 435, 458

[56] References Cited

PUBLICATIONS

The E. H. Wachs's Company Manual for Model TM–2 Truck Mounted Valve Operator—pub prior to Nov.89.
The E. H. Wachs Company Manual for Model TM–3 Truck Mounted Valve Operator—pub prior to November 1989.

*Primary Examiner*—Hoang Minh Nguyen

[57] ABSTRACT

A hydraulic valve operator includes a pair of reversible, variable speed hydraulic motors mounted on a swivel housing which is in turn mounted to an extendable frame assembly. The motors are disposed on diametrically opposite sides of a bull gear cavity formed on the swivel housing into which is placed a bull gear. The bull gear is meshed with pinion gears driven by the respective hydraulic motors. The bull gear has a vertically extending swivel bore formed thereon into which nests a drive swivel, the drive swivel being free to rotate about its vertical axis therein. The drive swivel has a vertical drive socket formed thereon for telescopical receipt of an elongated valve drive rod therein. The drive rod has connected at the bottom end thereof a drive head to engage and act upon the drive coupling of the valve stem which is to be rotated to either open or close the respective valve stem.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY ADMENDMENT ARE PRINTED HEREIN.

Column 7, lines 40–64:

In operation, the hydraulic valve operator [10] of the present invention may be mounted across the top edges of the side walls of a pick up truck (FIG. 6) or may be flat bed mounted. When it becomes desirable to either open or close an underground valve, the truck is driven adjacent the hole leading down to the respective drive coupling on the valve stem. The operator may then manually extend the rails 26 and 27 until the vertical passage 49 on the drive swivel 22 is generally aligned with the drive coupling on the valve stem. If the drive coupling and vertical drive socket are not or cannot be perfectly aligned then the drive swivel 22 and the universal joint 37 may be adjusted to engage the drive coupling on the valve stem, as described below. When the rails have been telescopically extended to the desired position, the operator manually slides the hitch pins 71 through the adjustment pin bores 72 and 119 formed on, respectively, the rails 26 and 27 and the tubes 29 thereby securely locking the rails in position. The valve drive rod 32 is then slidably extended downwardly through the vertical passage 49 formed on the drive swivel 22 until the drive head engages the drive coupling on the valve stem. If the drive socket and the drive coupling on the valve stem are not perfectly aligned, then the operator may manually rotate the drive swivel and pivot the universal joint 37 until the valve drive head engages the drive coupling on the valve stem.

Column 7, lines 65–66, column 8, lines 1–27:

The hydraulic valve operator is then actuated by means of the hydraulic pump 131. The three way switch 66 may then be switched from neutral to either forward or reverse, depending on whether the valve is to be opened or closed. Assuming the valve is to be opened, the switch is turned to the forward position to flow hydraulic fluid through the fluid nose 55 to the control manifold 51 and consequently spool valve 50 (FIG. 9). The spool valve 50 then directs the fluid from the manifold to the hydraulic motors 12 and 13 through the conduit 58 thereby activating such motors to rotate the respective pinion gears 18 (FIG. 5) engaged on the diametrical opposite sides of the bull gear to apply balanced drive forces thereto to drive the bull gear 20. The bull gear and drive swivel are fixedly connected to one another so that any rotation of the bull gear creates a corresponding rotation of the drive swivel. As such, the drive swivel is driven by the rotation of the bull gear to rotate as well. The valve drive rod and the vertical passage formed on the drive swivel are both square in cross section so that there can be no relative radial rotation between the two. Therefore the valve drive rod, universal joint, and drive head are all simultaneously rotated thereby rotating the drive coupling on the valve stem to which the drive head is engaged which serves to open the valve. The counter gear [36] *34 has a gear* (*not shown*) *which* is meshed with the bull gear so that the operator has a visual indication of the number of revolutions made by the bull gear and thus the drive coupling on the valve stem as well. Thus the operator may quickly and efficiently rotate the drive coupling on the valve stem any desired number of full turns of fractions thereof.

AS A RESULT OF REEXAMINATION, IT HAS BEEN DETERMINED THAT:

The patentability of claims 7, 10 and 12–15 is confirmed.

Claims 1–6, 8–9, 11 and 16 are cancelled.

* * * * *